Nov. 22, 1938.　　　　W. CHAMPION　　　　2,137,332
STEERING WHEEL ATTACHMENT
Filed June 9, 1937

Inventor
Warren Champion
By C.A. Snow & Co.
Attorneys.

Patented Nov. 22, 1938

2,137,332

UNITED STATES PATENT OFFICE 2,137,332

STEERING WHEEL ATTACHMENT

Warren Champion, Pekin, Ill.

Application June 9, 1937, Serial No. 147,366

1 Claim. (Cl. 74—484)

This invention relates to an attachment designed for use on steering wheels of motor vehicles, the primary object of the invention being to provide means whereby the operator of the vehicle may operate the horn button, while his hands are gripping the wheel in steering the vehicle.

An important object of the invention is to provide a device of this character including a lever which may be readily and easily mounted on the steering wheel, the lever being of a length to extend to a position to be engaged by the fingers of the hand gripping the steering wheel, eliminating the necessity of the operator removing his hands from the wheel, to operate the lever.

With the foregoing and other objects in view, which will appear as the description proceeds, the invention resides in the combination and arrangement of parts and in the details of construction hereinafter described and claimed, it being understood that changes in the precise embodiment of the invention herein described, may be made within the scope of what is claimed, without departing from the spirit of the invention.

Referring to the drawing.

Figure 1:
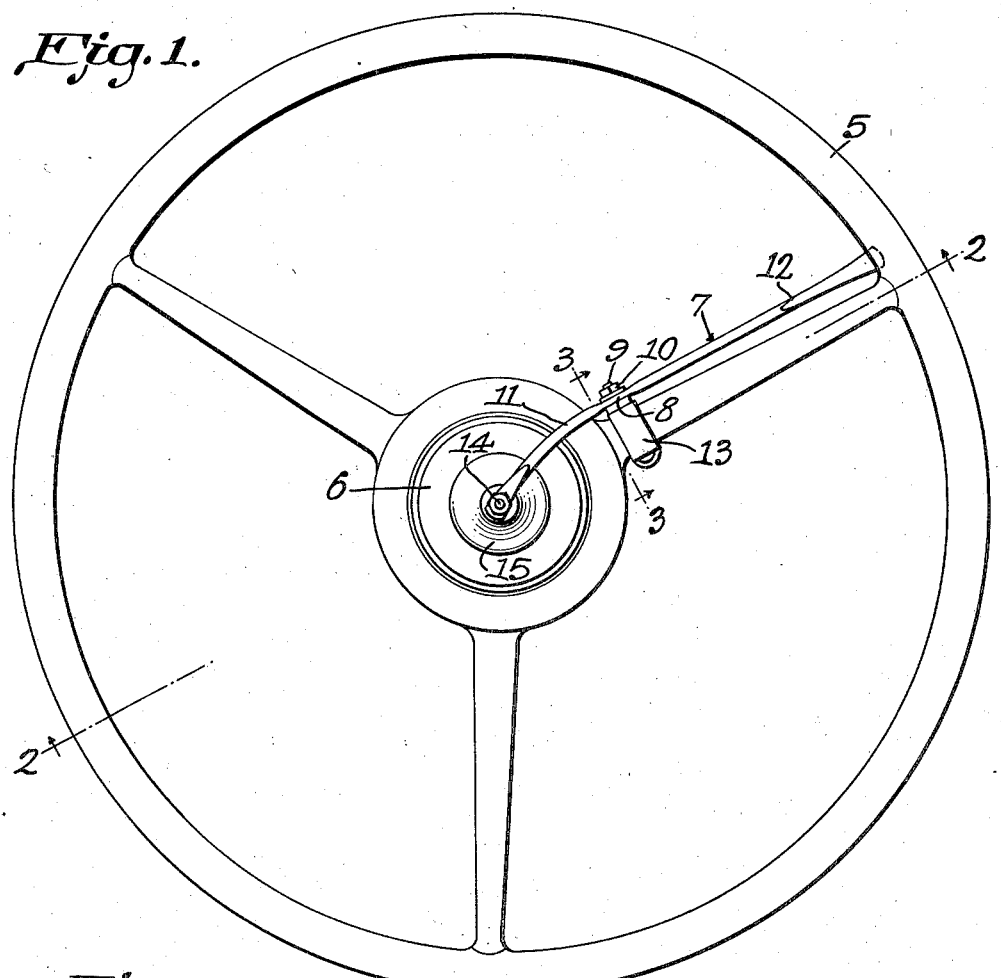
Figure 1 is a plan view of a steering wheel equipped with a horn button operating mechanism, constructed in accordance with the invention.

Referring to the drawing in detail, the reference character 5 designates a steering wheel, which is of the usual and well known construction, the steering wheel providing a support for the usual horn button indicated by the reference character 6.

The device forming the subject matter of the present invention includes a lever indicated generally by the reference character 7, and as shown, the lever is formed with a central offset portion 8, which is provided with an opening to receive the bolt 9, the bolt being secured to the lever, by means of the nut 10.

Figure 2:
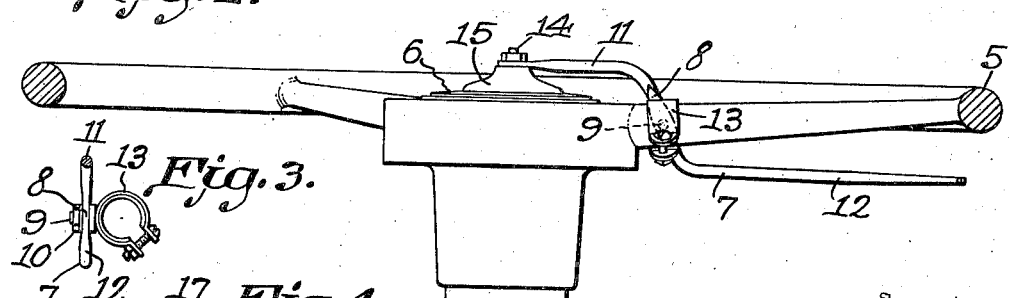
Figure 2 is a sectional view taken on line 2—2 of Figure 1.
Figure 3:
Figure 3 is a sectional view taken on line 3—3 of Figure 1.

This offset portion 8, permits the lever to be supported in such a way that there is provided an upper arm 11 and a lower arm 12, the lower arm 12 being of a length to extend to a position directly under the rim of the steering wheel, as clearly shown by Figure 2 of the drawing. The bolt 9 secures the clamp 13 to the lever, the clamp being secured to one of the spokes of the steering wheel. While the bolt 9 secures the lever 7 to the clamp 13, the connection between the bolt 9 and lever is such as to permit of pivotal movement of the lever.

Secured to one end of the arm 11, as by means of the bolt 14, is a suction cup indicated by the reference character 15, which may be secured to the horn button, by cementing or other adhesive material.

Figure 4:
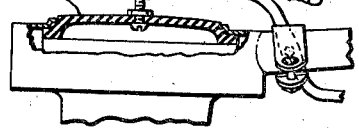
Figure 4 is an elevational view disclosing a horn button in section, and illustrating a modified form of lever attaching means.

In the form of the invention as illustrated by Figure 4 of the drawing, the horn button is indicated by the reference character 16, and is formed with a central opening to accommodate the bolt 17, which bolt passes through an opening in one end of the lever 18, the bolt being secured in position by means of the nuts 19 which are positioned on the bolt 17.

From the foregoing it will be seen that due to the construction shown and described, the operator may position his fingers under the outer end of the lever of the attachment, and may by moving the lever upwardly, cause the opposite end of the lever to be pressed against the horn button, sounding the horn of the vehicle, and eliminating the necessity of the operator removing his hand from the wheel in causing a signal to be made.

Having thus described the invention, what is claimed is:

An attachment for steering wheels having horn buttons, comprising a lever having an offset portion intermediate the ends thereof, and having an opening, a clamp adapted to be clamped around a spoke of a steering wheel, a pin extending from the clamp and positioned in the opening of the lever, pivotally mounting the lever on the steering wheel, one end of the lever being secured to the horn button, the opposite end of the lever lying directly under the rim of the steering wheel to be engaged by the fingers of the hand gripping the wheel, for operating the lever.

WARREN CHAMPION.